June 19, 1934.  J. E. HIRES  1,963,902
METHOD FOR PERFORATING AN IDENTIFYING TRADE MARK ON
NATURAL LEAVES OF FLOWERS AND OTHER PLANT LIFE
Filed Aug. 30, 1933   2 Sheets-Sheet 1
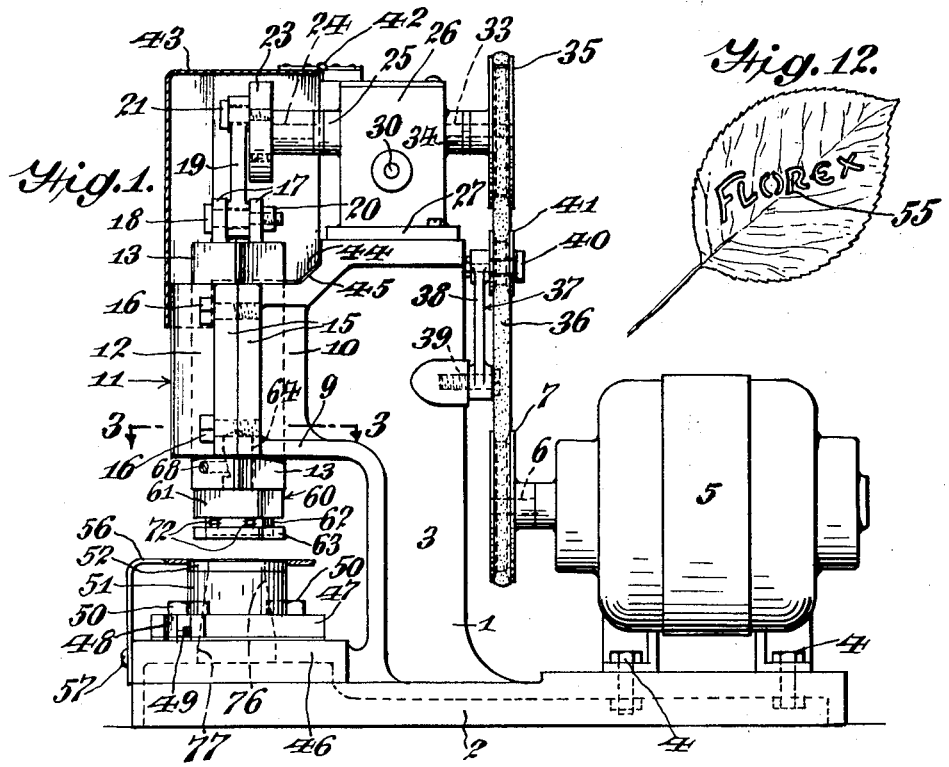
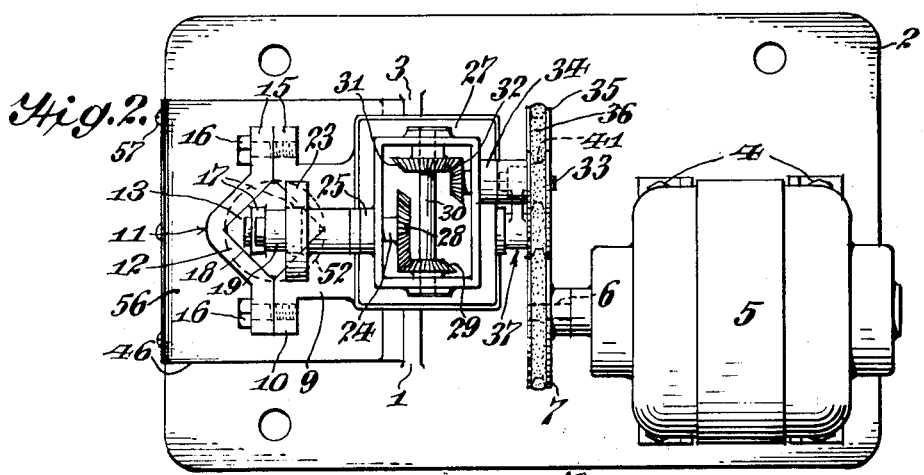
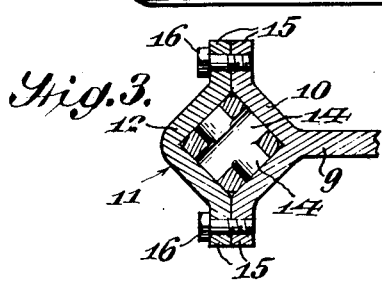
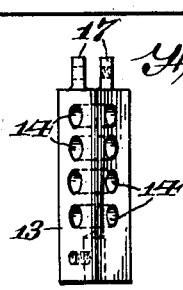
John E. Hires,
INVENTOR
BY Victor J. Evans & Co.
ATTORNEY

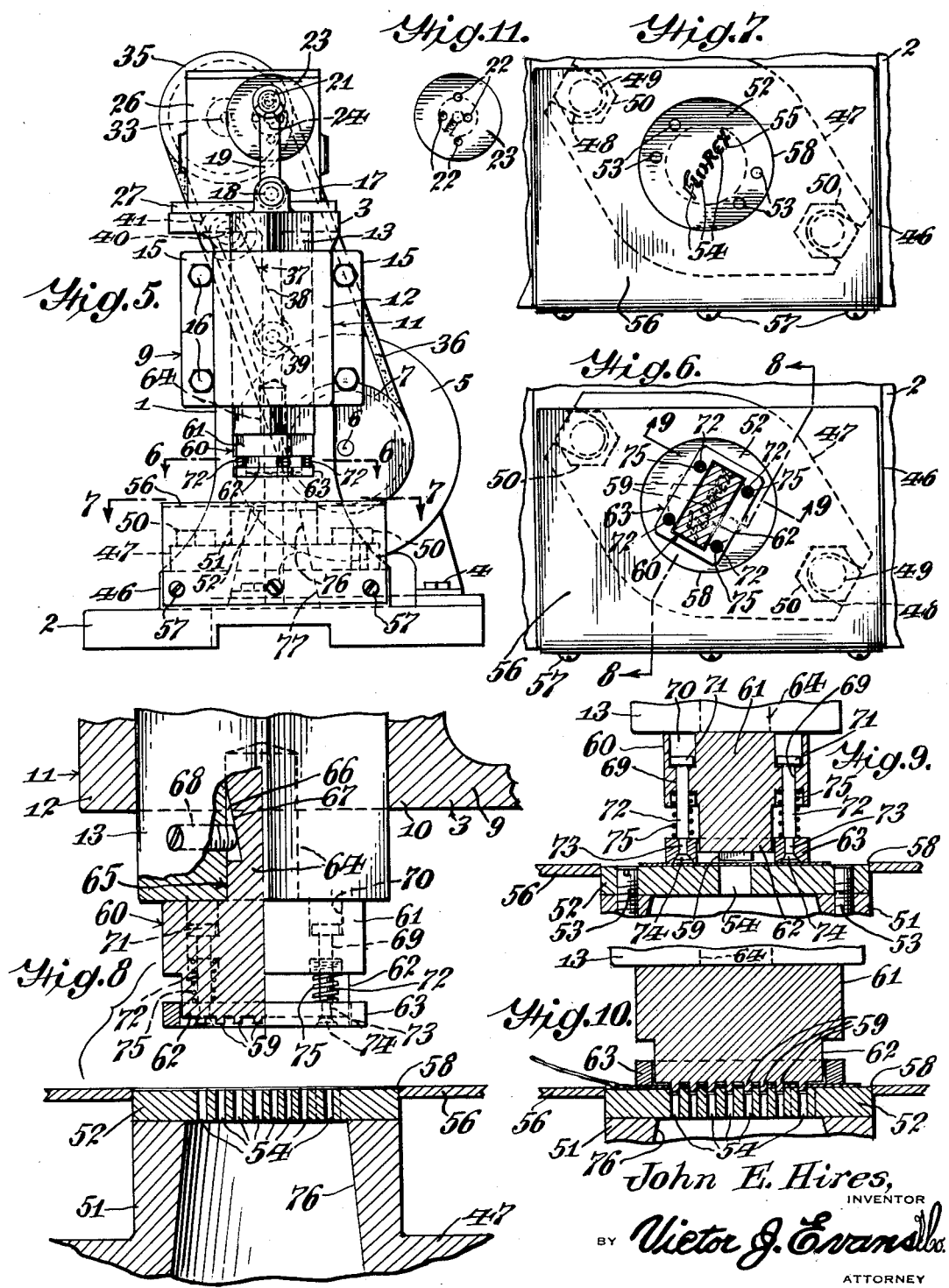

Patented June 19, 1934

1,963,902

UNITED STATES PATENT OFFICE 1,963,902

METHOD FOR PERFORATING AN IDENTIFYING TRADE MARK ON NATURAL LEAVES OF FLOWERS AND OTHER PLANT LIFE

John E. Hires, Ardmore, Pa., assignor to The Florex Gardens, Inc., North Wales, Pa., a corporation of Pennsylvania Application August 30, 1933, Serial No. 687,526

4 Claims. (Cl. 101—26)

This invention relates to an improved method for applying an identifying trade mark on natural leaves of various flowers and other plant life, through the medium of perforating the natural leaf with the trade mark.

To accomplish this it is the purpose of the invention to employ cooperative male and female perforating elements, the former passing though a stripper device in order to enter the female perforating element and to pass through the natural leaf, it being another purpose to take the natural leaf and so insert it between the female perforating element and the stripper, that when the stripper moves downwardly against and to hold the natural leaf in position, such operation will be accomplished with a gradual light feather like touch of pressure, so as to not bruise any of the veins of the leaf, as well as not rupturing portions of the perforated trade mark, as well as not mashing the leaf in any manner.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in side elevation of the improved machine for applying an identifying trade mark to leaves of flowers and other plant life.

Figure 2 is a plan view of Figure 1 and showing more clearly the speed change gear.

Figure 3 is a sectional view on line 3—3 of Figure 1.

Figure 4 is a detail view in elevation of the plunger which is designed to carry the male perforating element.

Figure 5 is a view in front elevation of the machine shown in Figure 1.

Figure 6 is a sectional view on line 6—6 of Figure 5.

Figure 7 is a sectional view on line 7—7 of Figure 5.

Figure 8 is a sectional view on line 8—8 of Figure 6.

Figure 9 is a sectional view on line 9—9 of Figure 6.

Figure 10 is a sectional view similar to certain portions in Figure 8, showing the male and female perforating elements as interengaged.

Figure 11 is a detail view of the disc 23 showing the openings 22.

Figure 12 is a detail view of a leaf of a flower or plant life showing the identifying trade mark as applied thereto by perforating same.

Referring to the drawings 1 identifies a frame, which comprises a base 2 and a standard 3. The under surface of the base is hollowed out for lightening the structure, and removably fastened at 4 thereon is an electric motor 5 of any conventional well known type, and the drive shaft 6 thereof carries a grooved pulley 7. The standard 3 of the frame has an overhanging part 9, extending upward from which is one half 10 of a guide bearing 11, while 12 identifies the other half of the guide bearing 11. This guide bearing 11 (which is rectangular or square in cross section as shown in Figure 3) receives and guides a plunger 13, which is correspondingly shaped in cross section. The fit of the plunger in its bearing is designed to be relatively close, but not too close as would permit binding, but just enough as to provide for a sliding movement without angling or binding therein. Due to the plunger having transverse intersecting openings 14 to receive suitable lubricant uniform vertical reciprocations without binding of the plunger are assured. As shown in Figure 3 the two halves 10 and 12 of the guide bearing 11 have corresponding flanges 15 which receive bolts or other fastening means 16, for the purpose of holding the parts together, and yet not too close as would result in binding of the plunger.

The upper end of the plunger is provided with spaced ears 17, between which and on a bolt 18 one end of a link 19 is pivotally mounted, the bolt 18 having a retaining nut 20. The link 19 is in turn pivotally connected to the headed stud bolt 21, which may be threadingly mounted in any one of the eccentrically arranged openings 22 formed in a disc 23, which is keyed on one end of a shaft 24 mounted in a bearing 25 of a suitable housing or casing 26, the base 27 of which is mounted in any suitable manner on the upper end of the standard 3.

The end of the shaft 24 which extends into the housing or casing 26 carries a bevel gear 28 meshing with a bevel gear 29 on one end of a shaft 30, which is mounted in bearing of the casing or housing 26 in a position at right angles to the shaft 24. An additional bevel gear 31 is carried by the shaft 30 at its other end, and it in turn meshes with a bevel gear 32 on one end of a shaft 33, which is also mounted in a bearing 34 of the housing or casing 26. This shaft 33 carries exteriorly of the casing or housing 26 a suitable grooved pulley 35 similar to and with its groove aligned with that of the pulley 7, whereby an endless belt 36 possesses capability of transmitting power from the motor 5 to the shaft 33.

It is obvious that a conventional type of belt tightener 37 is employed, for cooperation with the belt 36, in order to regulate its tension. This belt tightener 37 comprises an arm 38 pivoted at 39, its pivot being such as to retain the arm rigid when once set according to the tension or tightness desired on the belt. The free and unattached end of the arm 38 carries a headed stud 40, on which a grooved pulley 41 is mounted, and which lies against one side of the belt, and therefore by disposing the arm in the position desired the belt may be tightened. It is also obvious that while any suitable pulleys 7, 35 and 41 may be employed, it is preferable in this instance to use the V shaped groove type of pulley for carrying a belt which has its inner surface correspondingly shaped.

It is obvious by adjusting the stud 21 it is possible to increase or decrease the throw of the plunger. Obviously by interchanging the gears 28, 29, 31 and 32, or by using gears of other diameters, it is possible to alter the speed of the machine.

Hingedly mounted at 42 on the housing or casing 26 is a hood or cover 43, for the purpose of incasing or housing the upper end of the plunger and its connections with the disc 23. It will be noted that this cover has the lower edges 44 of the sides conforming to the contour 45 of that portion of the standard 3 which overlies the male and female perforating elements, the cover obviously precluding dust, dirt and other foreign matter from connections between the reciprocating plunger and said shaft 24.

One end of the base 2 opposite where the motor 5 is mounted extends into a boss 46, upon the surface of which rests a plate 47. To retain the plate 47 in and regulate its position the opposite ends of the plate has bifurcations 48 which straddle or receive the shanks 49 of bolts 50, which are threaded into the boss 46. The plate 47 also has an upstanding boss 51 which is cylindrical, upon which is mounted the female perforating element 52, there being studs 53 penetratable and threaded therethrough and into the boss 51 for retaining the female perforating element 52 in position, whereby the openings 54 represent the female portions of the symbols making up the identifying trade mark, which in the present instance is the word "Florex" identified at 55 in Figures 7 and 12. Obviously this identifying trade mark may be varied in many ways according to the dictates of those who are using this type of machine.

A shield 56 in the form of an angular plate fastened at 57 is employed to overhang the plate 47 and its boss 51 which supports the female perforating element. This shield 56 has a circular opening 58 therein, partially through which the female perforating element extends, though this feature may be covered, particularly according to the position of the shield. This angular plate while functioning as a shield acts more as a guide for the leaves of the flowers or other plant life, when inserting the leaf between the male and female perforating elements. By adjustment of the plate 47 the female perforating element may be arranged so that its openings 54 may properly register with and receive the male portions 59 of the male perforating element 60, when perforating the various symbols constituting the identifying trade mark.

The male perforating element comprises a body 61, a lower reduced portion 62, on which a stripper element 63 is slidably suspended. The body of the male perforating element has an upstanding stud 64 preferably rectangular or square in cross section, which is received in a correspondingly shaped bore 65 of the lower end of said plunger 13. The stud 64 has a triangular shaped recess 66, with the inclined surface 67 of which a retaining screw 68 impinges, acting to draw the stud 64 into and retain it in the bore 65. The body 61 of the male perforating element has a plurality of vertical openings 69, the upper larger portions 70 of which are designed for guiding the heads 71 of the stripper suspending bolts 72, while the restricted portions of the openings receive the shanks of the suspending screws. The lower ends of the suspending bolts have reduced portions 73 which pass through the stripper plate 63 and are headed at 74 to render the stripper plate rigid with the suspending bolts. Interposed between the body of the male perforating element and the stripper plate and in surrounding relation to the shanks of the suspending bolts are coil springs 75, the tension of which is to be just sufficient to retain the stripper plate in its lowermost suspended position, and in such wise as to permit the stripper plate to have a light feather touch upon the leaf to be perforated so as not to mar or injure the fiber, veins or other parts of the leaf. The springs are of such type and the stripper plate so suspended, that the plate first engages with the leaf to retain it in position, while the male perforating element may subsequently descend and cause its portions 59 to pass through the leaf and then into the portions 54 of the female perforating element.

After perforating the leaf or other article (it being obvious that any article such as printed sympathy and compliment season and other cards may be perforated), the male perforating element recedes, and during this movement the stripper plate strips the body of the leaf from the male die.

The male and female perforating elements may be constructed of any character of metal suitable for the purpose, and the plate 47 and its boss 51 are hollowed out as shown at 76, which hollow registers with an opening 77 in the wall of the boss 46, so that the particles removed from the leaf during the perforating action may deposit in the space below the base 2.

The invention having been set forth, what is claimed is:

1. In a method for applying an identifying trade mark to natural leaves of flowers and other plant life by perforating the same, the steps consisting in taking a leaf and inserting the same between male and female perforating elements, retaining the leaf on the female element by applying a feather like touch of pressure on said natural leaf without crushing the leaf and rupturing said identifying mark, and finally penetrating the leaf with a male perforating element while the leaf is held in place.

2. In a method for applying an identifying trade mark to natural leaves of flowers and other plant life by perforating the same, the steps consisting in taking a leaf and inserting same between male and female perforating elements, applying a retaining pressure of a feather like touch on said natural leaf without crushing same and rupturing said identifying mark, retaining the leaf against the female perforating element, penetrating a male perforating element through the leaf while held in place and into a female perforating element.

3. In a method for applying an identifying trade mark to natural leaves of flowers and other plant life by perforating the same, the steps consisting in taking a leaf and inserting the same between male and female perforating elements, retaining the leaf on the female element by applying a feather like touch of pressure on said natural leaf without crushing the leaf and rupturing said identifying mark, and finally penetrating the leaf with a male perforating element while the leaf is held in place, receding the male perforating element, stripping the leaf from the male perforating element without damage to the identifying mark, and finally storing the leaf particles resulting from perforating the leaf.

4. In a method for applying an identifying trade mark to natural leaves of flowers and other plant life by perforating the same, the steps consisting in taking a leaf and inserting same between male and female perforating elements, applying a retaining pressure of a feather like touch on said natural leaf without crushing the leaf and rupturing said identifying mark, retaining said leaf against the female perforating element, penetrating a male perforating element through the leaf while held in place and into a female perforating element, receding the male perforating element, stripping the leaf from the male perforating element without damage to the identifying mark, and finally storing the leaf particles resulting from perforating the leaf.

JOHN E. HIRES.